R. T. McCLURE
NUT LOCK.
APPLICATION FILED NOV. 21, 1914.
1,140,272.
Patented May 18, 1915.
2 SHEETS—SHEET 1.
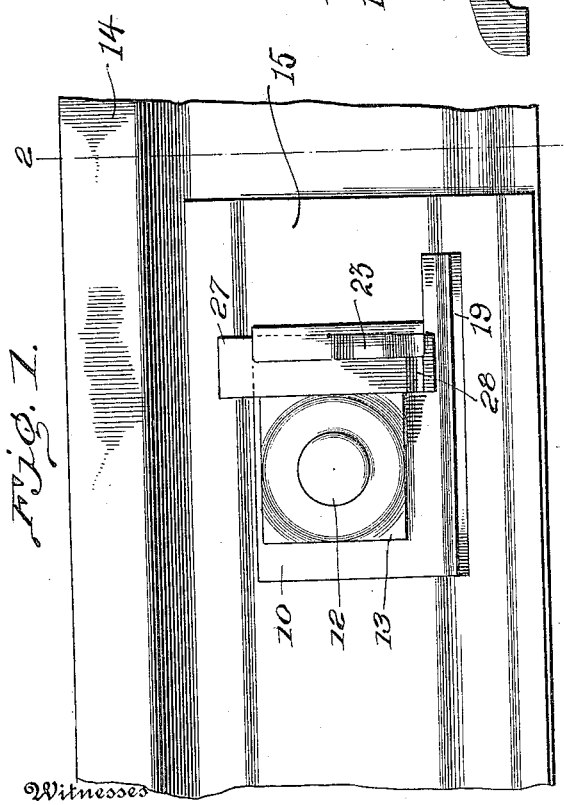
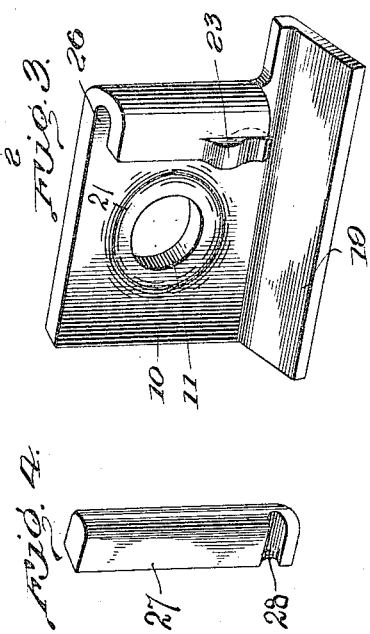
Witnesses
C. N. Woodward.
W. N. Woodson.
Inventor
R. T. McClure
By
[signature]
Attorneys.

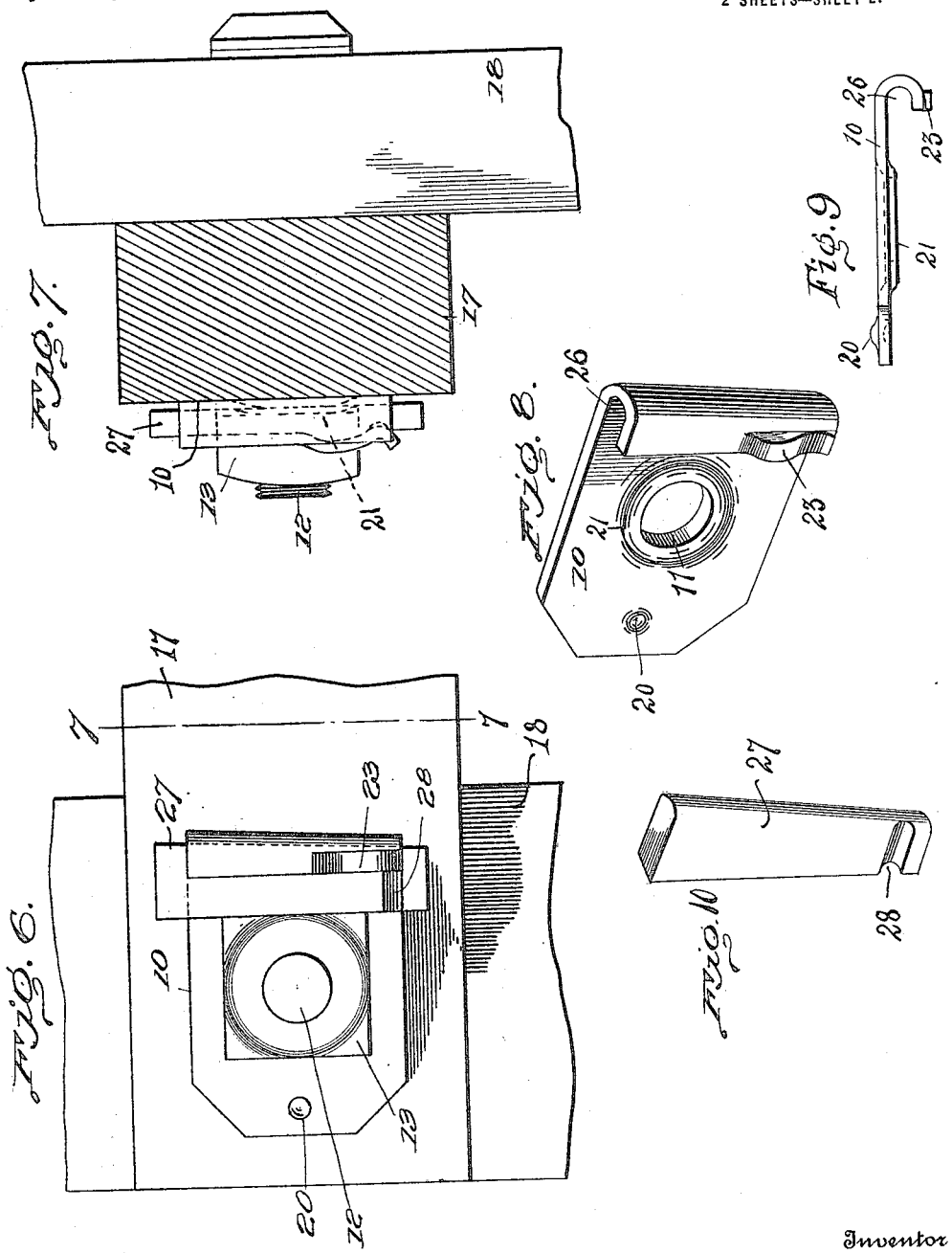

UNITED STATES PATENT OFFICE.

ROBERT T. McCLURE, OF GRANDVIEW, WEST VIRGINIA.

NUT-LOCK.

1,140,272. Specification of Letters Patent. Patented May 18, 1915.

Application filed November 21, 1914. Serial No. 873,348.

*To all whom it may concern:*

Be it known that I, ROBERT T. MCCLURE, a citizen of the United States, residing at Grandview, in the county of Raleigh and State of West Virginia, have invented certain new and useful Improvements in Nut-Locks, of which the following is a specification.

This invention relates to improvements in nut locks for preventing the retrograde movement of nuts upon bolts, and has for one of its objects to provide a simply constructed device which may be applied to nuts and bolts of various sizes and forms and to nuts and bolts employed for various purposes, and has for another one of its objects to simplify and improve the construction and increase the efficiency and utility of a device of this character.

Another object of the invention is to provide a simply constructed device which may be applied to a nut without alteration in the nut.

With these and other objects in view, the invention consists in certain novel features of construction as hereinafter shown and described and then specifically pointed out in the claims.

The improved device may be applied to nuts and bolts employed for uniting various shapes and sizes of bodies, and it is not desired, therefore, to limit the invention in any manner in this respect, but for the purpose of illustration, the improved device is shown applied to one of the nuts of one of the clamp bolts of an ordinary railway rail joint, and likewise shown applied to a bolt or nut employed for connecting two bodies other than the clamp members of a railway rail joint.

In the drawings, illustrative of the preferred manner of using the invention, Figure 1 is a side elevation of a railway rail joint including one of the clamp bolts with the improved locking member applied; Fig. 2 is a section on the line 2—2 of Fig. 1; Figs. 3 and 4 are perspective views of the nut locking device with the parts separated; Fig. 5 is a view of the blank from which the body portion of the locking device is constructed; Fig. 6 is a view similar to Fig. 1, showing the improved device applied to the nut of a bolt which is employed for uniting two members other than the clamp bars of a railway rail joint. Fig. 7 is a section on the line 7—7 of Fig. 6. Fig. 8 is a view similar to Fig. 3, illustrating the construction of the locking members shown in Figs. 6 and 7. Fig. 9 is a plan view of the locking members as shown in Figs. 6, 7 and 8. Fig. 10 is a detached perspective view of the locking key employed in the structure shown in Figs. 6 and 7.

Corresponding and like parts are referred to in the following description and indicated in all the views of the accompanying drawings by the same reference characters.

The improved device comprises a plate or body member, represented as a whole at 10, and preferably formed from sheet metal, and initially in the form shown in Fig. 5 with an aperture 11 to engage over the bolt, represented conventionally at 12, and between the nut, represented conventionally at 13, and the parts which the bolt and nut are designed to clamp together.

In Figs. 1 and 2, the device is shown applied to a railway rail joint, the rail being indicated conventionally at 14, and the clamp or fish plates at 15—16 of usual form, and in Figs. 6 and 7 the bolt and its nut are shown employed for clamping two bodies together, the bodies being represented conventionally at 17—18.

When employed upon a railway rail joint, the body 10 encircles the bolt 12 and bears between the nut 13 and one of the fish plates, for instance, the fish plate 15, and when employed for holding the bodies 17—18 together, the plate 10 bears upon one of the members, for instance, the member 17, and between the nut and the member which is held. When employed upon a railway rail joint, the lower portion of the plate 10 is bent outwardly, as represented at 19, and bears upon the outwardly directed portion of the plate 15, the member 10 being thus held from rotation upon the bolt.

When employed upon the structure illustrated in Figs. 6 and 7 a protuberance 20 will be formed on the body 10 to enter a cavity in the member 17 to hold the member 10 from rotation. Any suitable means may be employed for preventing the body 10 from rotating upon the bolt, the holding means depending on the structure upon which the device is employed. The member 10 is preferably dish-shaped, as indicated at 28, to assist in holding the nut.

By reference to Fig. 5, it will be noted that the member 10 is provided with a cleft, indicated at 21, and communicating through one end of the plate and another cleft 22 extending in parallel relation to one end of the plate and terminating at the cleft 21. By this means, a tongue 23 is produced which may be bent into the shape shown in Figs. 2, 3, 7 and 8 to form a resilient holding device, the object to be hereinafter explained.

In constructing the holding device, the portion of the plate 10 above the cleft 21 is bent at right angles to the body of the plate along the dotted line 24 and the bent over portion again bent at right angles to the first bent portion along the dotted line 25, thus forming a channel, represented at 26, as illustrated in Figs. 3 and 8, with the tongue 23 at the inner edge of the channel.

A key, represented at 27, is disposed in the channel 26 against one side of the nut 13 after the latter has been turned "home" by a wrench or other suitable instrument. The key 27 is provided with a transverse recess 28 into which the free end of the tongue 23 engages when the key is forced to its lowest position, to prevent the key from being accidentally released, and at the same time the key may be readily removed when a sufficient force is employed, to release the nut.

The channel 26 may be arranged to extend at right angles to the upper edge of the member 10, as shown in Figs. 1, 2, 3 and 5, or slightly inclined, as indicated in Figs. 6 and 7, the key 27 being likewise inclined or slightly wedge shaped on one side to correspond to the inclination of the outer side of a channel. By constructing the key in the form shown in Figs. 6 and 9, a wedging action is possible between the nut and the member 10, to more firmly lock the parts together. This arrangement may be found advantageous under certain circumstances.

Having thus described the invention, what is claimed as new is:

1. A nut lock comprising a body apertured to receive a bolt and with a key receiving channel opening toward the bolt receiving aperture, a resilient tongue carried by said body and projecting into said channel, and a key engaging in said channel and engaged by said tongue, said key being adapted to engage a nut upon said bolt.

2. A nut lock comprising a body apertured to receive a bolt and with a key receiving channel opening toward the bolt receiving aperture, one wall of said channel having a cleft to produce a resilient tongue adapted to be projected into the channel, and a key engaging in said channel and engaged by said tongue, said key being adapted to engage a nut upon said bolt.

In testimony whereof I affix my signature in presence of two witnesses.

ROBERT T. McCLURE. [L. S.]

Witnesses:
  J. C. FARLEY,
  E. W. FLESHMAN.

Copies of this patent may be obtained for five cents each, by addressing the "Commissioner of Patents, Washington, D. C."